United States Patent [19]

Lennon

[11] Patent Number: 5,209,508
[45] Date of Patent: May 11, 1993

[54] BICYCLE, HANDLEBAR AND ADAPTER SYSTEM

[76] Inventor: Dan C. Lennon, 4940 Stuckey, Bozeman, Mont.

[21] Appl. No.: 758,187

[22] Filed: Sep. 12, 1991

Related U.S. Application Data

[63] Continuation of Ser. No. 501,687, Mar. 29, 1990, abandoned, which is a continuation-in-part of Ser. No. 428,373, Oct. 27, 1989, abandoned, which is a continuation-in-part of Ser. No. 173,765, Mar. 28, 1988, Pat. No. 4,878,397, which is a continuation-in-part of Ser. No. 1,616, Jan. 9, 1987, Pat. No. 4,750,754.

[51] Int. Cl.$^5$ .............................................. B62M 1/02
[52] U.S. Cl. .................. 280/261; 74/551.1; 74/551.8; 74/551.9; 280/288.4
[58] Field of Search ............ 280/261, 264, 279, 288.4; 74/551.1, 551.8, 551.9

[56] References Cited

U.S. PATENT DOCUMENTS

| | | | |
|---|---|---|---|
| D. 26,542 | 1/1897 | Henderson | D12/178 |
| D. 27,255 | 6/1897 | Stauffer | D12/178 |
| D. 27,660 | 9/1897 | Anschuetz | D12/178 |
| D. 28,297 | 2/1898 | Garden | D12/178 |
| D. 127,561 | 6/1949 | Cash | D12/178 |
| D. 211,144 | 5/1968 | Pawsat | D12/178 |
| D. 263,293 | 3/1982 | Janson | D12/178 |
| 313,234 | 3/1885 | Powers | 74/551.2 |
| 566,201 | 8/1896 | MacKinnon et al. | 280/270 |
| 567,663 | 9/1896 | Snyder | 74/551.1 |
| 581,260 | 4/1897 | Biddle | 74/551.9 |
| 586,678 | 7/1897 | Walsh . | |
| 587,626 | 8/1897 | Vollmer | 74/551.9 |
| 588,166 | 7/1897 | McCoy | 74/551.1 |
| 602,016 | 4/1898 | Johnson | 74/551.1 |
| 614,774 | 11/1898 | Spiker | 74/551.1 |
| 717,662 | 1/1903 | Ellison | 74/551.8 |
| 944,932 | 12/1909 | Abraham | 74/551.8 |
| 1,445,995 | 2/1923 | Carlson . | |
| 1,448,921 | 3/1923 | Ershkowitz . | |
| 1,660,131 | 2/1928 | Lenfers . | |
| 1,738,855 | 12/1929 | Thompson | 74/551.8 |
| 1,994,837 | 3/1935 | St. Onge . | |
| 2,059,669 | 11/1936 | Skoog | 74/551.1 |
| 2,491,609 | 12/1949 | George | 74/551.1 |
| 2,618,447 | 11/1952 | LeCarme | 244/83 |
| 2,699,903 | 1/1955 | White | 248/231 |

(List continued on next page.)

FOREIGN PATENT DOCUMENTS

| | | |
|---|---|---|
| 569239 | 2/1988 | Australia . |
| 451284 | 9/1948 | Canada . |
| 35359 | 9/1981 | European Pat. Off. . |
| 73010 | 1/1892 | Fed. Rep. of Germany . |
| 88154122 | 2/1989 | Fed. Rep. of Germany . |
| 794122 | 2/1936 | France . |
| 857732 | 9/1940 | France . |
| 961924 | 5/1950 | France . |
| 1539632 | 8/1968 | France . |

(List continued on next page.)

OTHER PUBLICATIONS

Bicycle Guide Magazine, Publication Date Sep./Oct. 1986 at p. 46.
Bicycle Guide Magazine, Publication Date Nov./Dec. 1986 at p. 44.

(List continued on next page.)

*Primary Examiner*—Mitchell J. Hill
*Attorney, Agent, or Firm*—Jenner & Block

[57] ABSTRACT

Novel handlebars for a bicycle are disclosed which provide gripping positions below the handlebar crosspiece. These lower drop positions allow a rider to comfortably maintain a low frontal area without the need for forwardly extending handlebar elements. The lower drop gripping positions can be included in new handlebars or can be added to conventional handlebars by installing adapter kits. Additionally, a handlebar strut system is disclosed which can more efficiently transfer rider power to the bicycle. The strut system reduces upward handlebar flex while allowing downward flex. This can allow the rider to accelerate more quickly while retaining the shock absorbing benefits of downward handlebar flex.

32 Claims, 3 Drawing Sheets

U.S. PATENT DOCUMENTS

| | | | |
|---|---|---|---|
| 2,816,775 | 12/1957 | Costello | 280/289 |
| 2,929,641 | 3/1960 | Alvistur | 280/261 |
| 3,289,493 | 12/1966 | Church | 74/551.1 |
| 3,529,490 | 9/1970 | Pawsat et al. | 74/551.1 |
| 3,884,092 | 5/1975 | Raudebaugh | 74/558.5 X |
| 3,937,629 | 2/1976 | Hamasaka | 74/551.8 |
| 3,945,337 | 3/1976 | Sweetman | 74/551.8 X |
| 3,966,229 | 6/1976 | Foster | 280/261 |
| 4,250,770 | 2/1981 | Robertson | 74/551.8 |
| 4,342,175 | 8/1981 | Ceransky et al. | 280/276 X |
| 4,384,497 | 5/1983 | Gatsos | 74/551.4 |
| 4,474,386 | 10/1984 | Kanemaki | 280/288.1 |
| 4,493,225 | 1/1985 | Galahad | 74/551.3 |
| 4,548,092 | 10/1985 | Strong, Jr. | 74/551.8 X |
| 4,750,754 | 6/1988 | Lennon | 280/261 |
| 4,862,762 | 9/1989 | Ross | 74/551.1 |
| 4,878,762 | 11/1989 | Lennon | 74/551.1 |
| 4,930,798 | 6/1990 | Yamazaki et al. | 280/261 |
| 4,951,525 | 8/1990 | Borromeo | 280/261 |
| 5,000,469 | 3/1991 | Smith | 280/279 |

FOREIGN PATENT DOCUMENTS

| | | |
|---|---|---|
| 60-72389 | 5/1985 | Japan. |
| 60-72390 | 5/1985 | Japan. |
| 1041386 | 9/1983 | U.S.S.R.. |
| 1159826 | 6/1985 | U.S.S.R.. |
| 15018 | of 1895 | United Kingdom. |
| 479565 | 2/1938 | United Kingdom. |

OTHER PUBLICATIONS

Outside Magazine, Publication Date Nov., 1986 at p. 56.
Bicycle Guide Magazine, Publication Date Sep./Oct., 1986 at p. 80.
1986 Huffy Bicycle Merchandising Catalog, selected pp. 4 and 5.

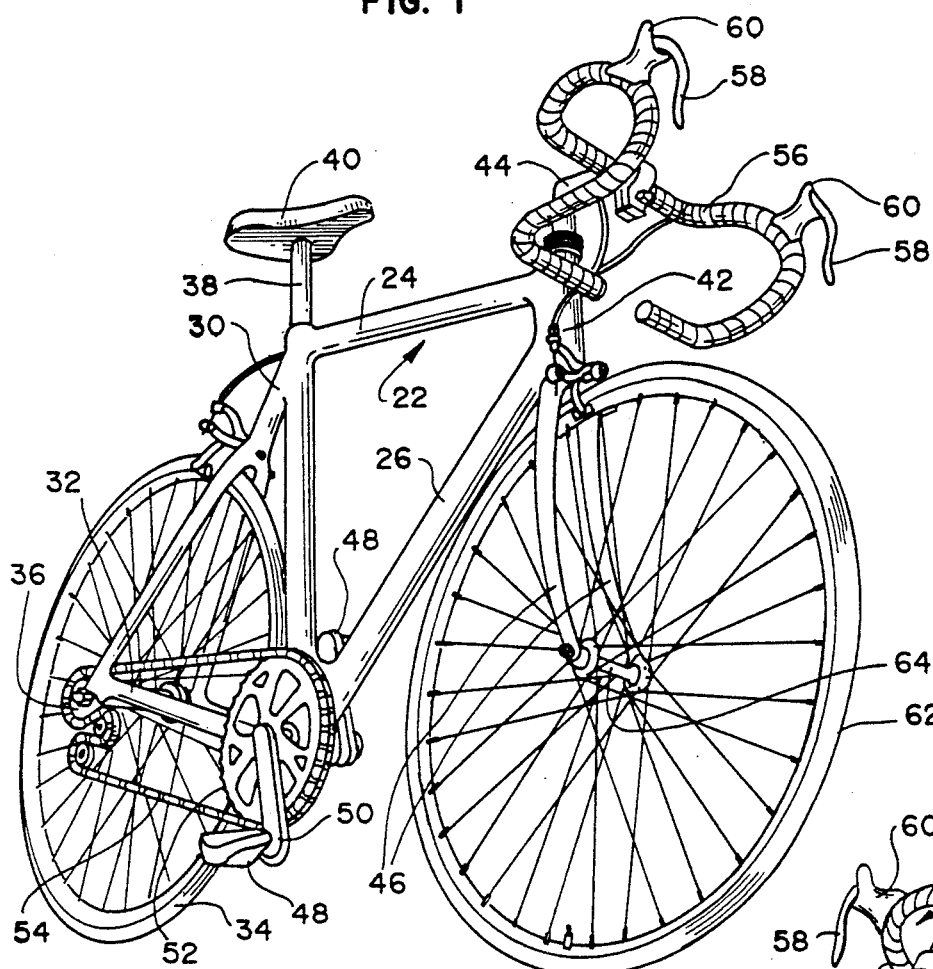
FIG. 1
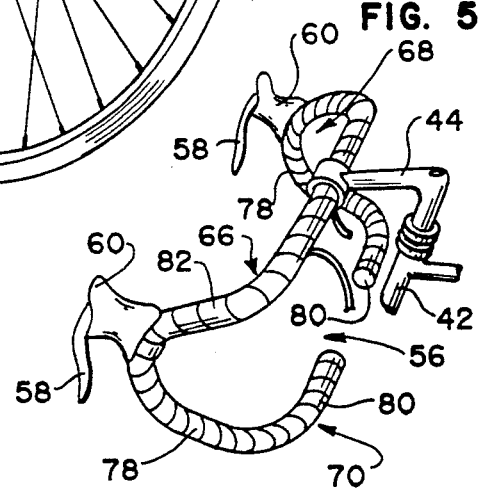
FIG. 5
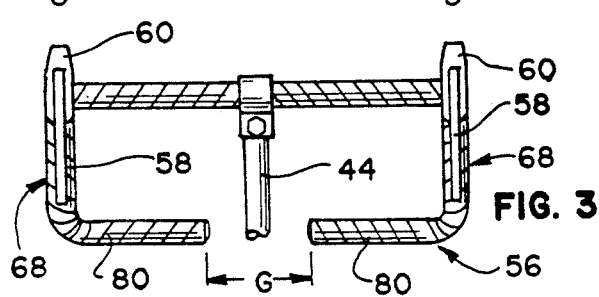
FIG. 2
FIG. 3
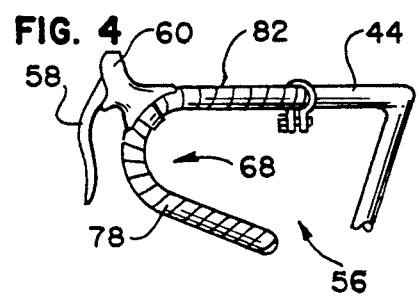
FIG. 4

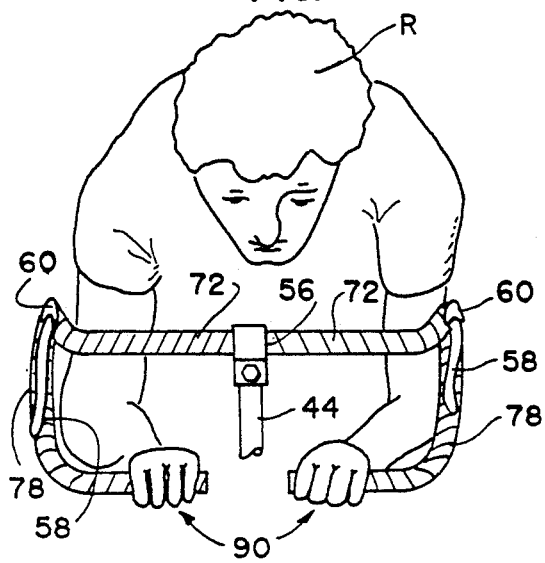
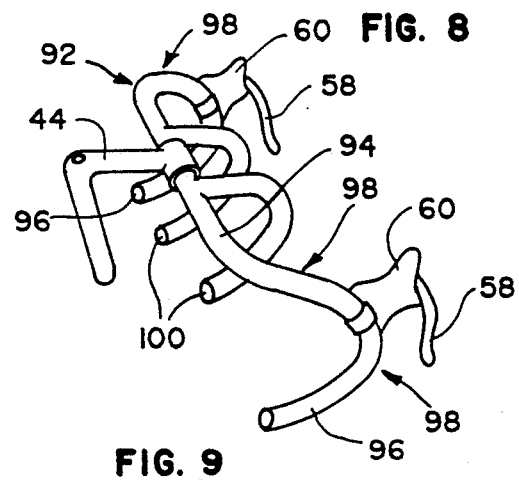
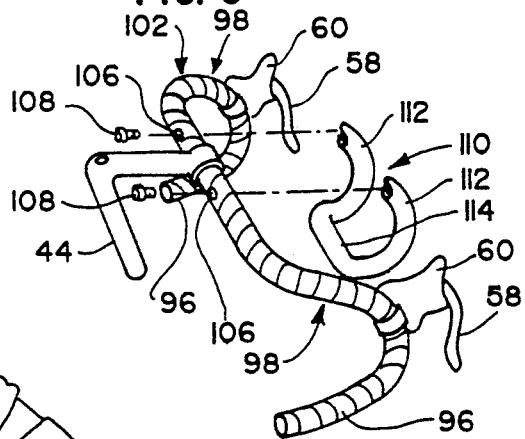
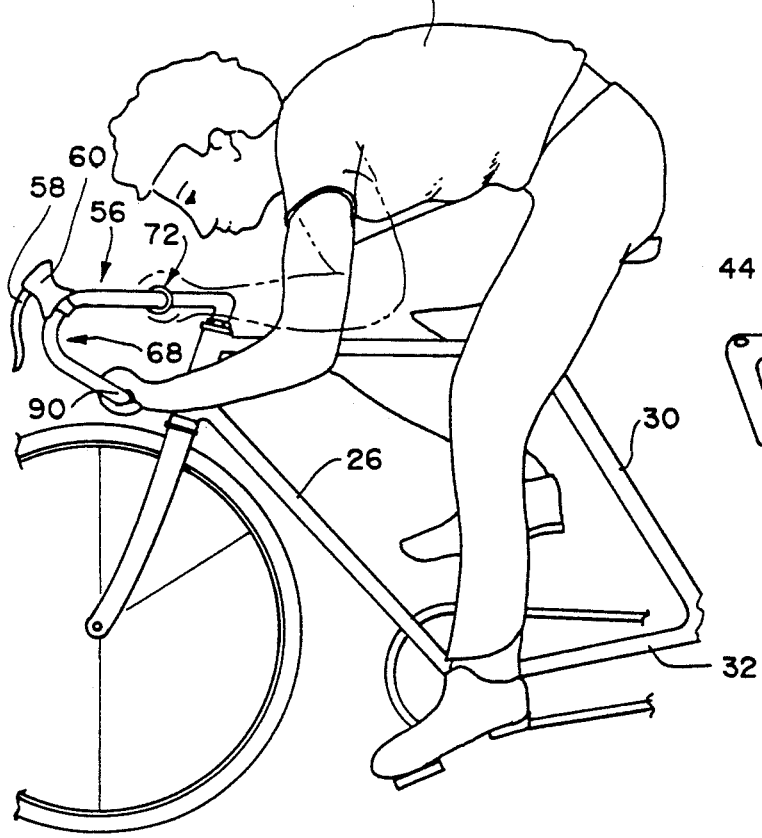
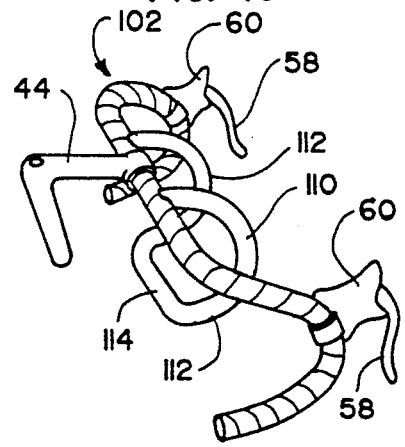

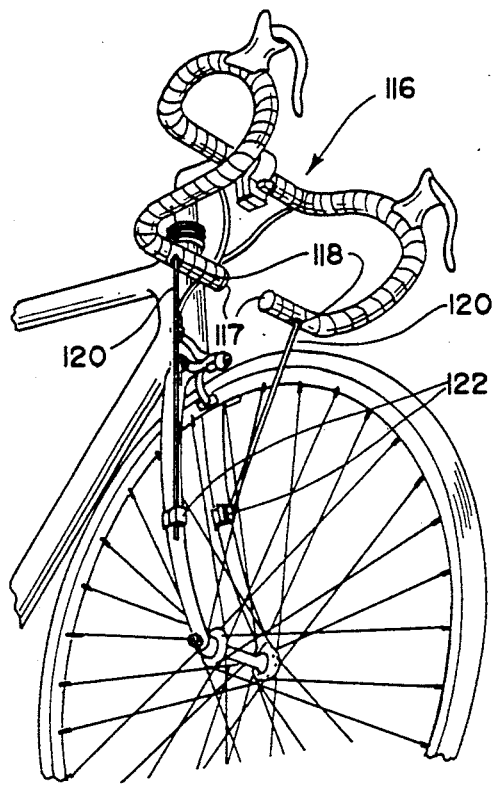
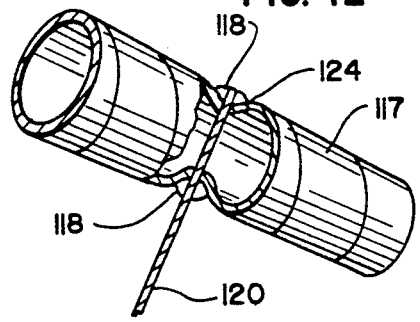
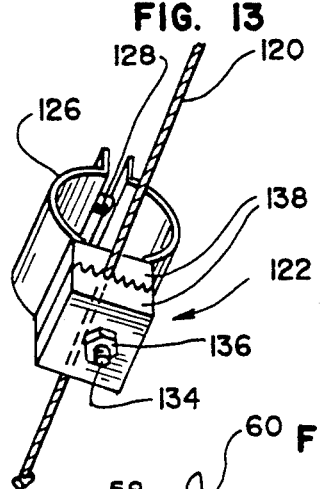
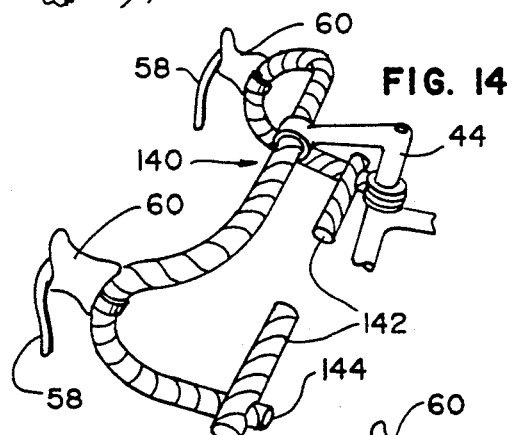
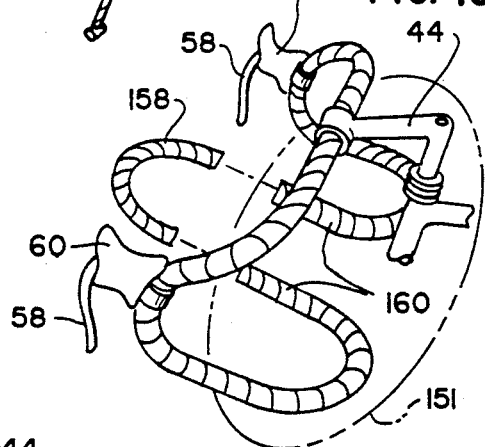
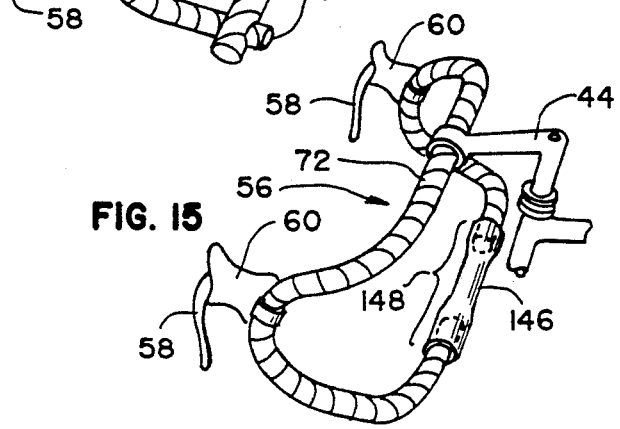
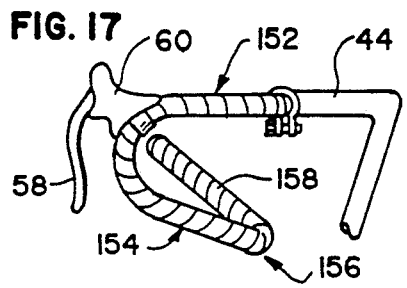

BICYCLE, HANDLEBAR AND ADAPTER SYSTEM

This application is a continuation of application Ser. No. 07/501,687, filed Mar. 29, 1990, now abandoned, which is a continuation-in-part of application Ser. No. 07/428,373, filed Oct. 27, 1989, now abandoned, which is a continuation-in-part of application Ser. No. 07/173,765, filed Mar. 28, 1988, now U.S. Pat. No. 4,878,397, which is a continuation-in-part of application Ser. No. 07/001,616, filed Jan. 9, 1987, now U.S. Pat. No. 4,750,754.

BACKGROUND OF THE INVENTION

This invention relates to bicycles and bicycle handlebars which improve bicycle rider performance and stamina and provide increased levels of rider comfort.

Bicycle design is a complex art. Seemingly minor structural changes can often yield significant performance advantages to bicycle riders. Typically, the performance advantages are most apparent in bicycle race competitions.

Competitive bicycle racing requires attention to several factors. Two important factors include rider comfort and frontal area profile of the bicycle and rider combination. Minimizing frontal area increases performance by reducing drag caused by the movement of the bicycle and rider through the air. Improving rider comfort enhances performance by allowing the rider to function for longer periods of time without tiring. Both frontal area and comfort are greatly affected by the position, shape and arrangement of the bicycle handlebars.

Frequently, the design of handlebars requires balancing the need for a reduced frontal area against providing an uncomfortable rider position. For example, a rider may be comfortable sitting in a relatively upright position. When a new handlebar design requires that the rider crouch lower to minimize his frontal area, his comfort level may be reduced because the handlebar forces him to maintain the crouched position for extended periods of time. Thus, balancing these two factors can constrain handlebar design.

Bicycle handlebar design is further constrained by the rules of various riding and racing organizations. These organizations sanction various riding events and require participating riders to comply with the organization's rules. Many of these rules are designed to promote the safety of the large number of riders which frequently ride in close proximity to one another. Thus, sanctioning body rules may prohibit the use of otherwise efficient handlebar designs when the design is thought to compromise rider safety. Such prohibitions have applied in some circumstances to handlebars which include handlebar portions which project substantially forward from the bicycle crosspiece and handlebars having forward facing grip ends which might be a hazard in a mass event start.

SUMMARY OF THE INVENTION

The present handlebar invention provides new handlebar designs which afford the rider a variety of handlebar gripping positions and allow the rider to comfortably minimize his frontal area while at the same time providing for the safety of nearby riders. The most desirable embodiments of the invention involve new handlebar and bicycle designs, but the invention also includes various adapter kits which a rider can fit to conventional drop bars to obtain many of the advantages of the new designs.

In one embodiment, the handlebar invention includes a crosspiece and intermediate drop portions which connect to a lower drop portion or portions. The lower drop portion or portions provide the rider with a variety of gripping positions beneath the cross bar and near the steering post. These lower drop positions, particularly those in a generally central region near the steering post, allow the rider to ride in a low, narrow position while at the same time holding his arms in a more comfortable position than would be possible with conventional drop bars. The lower drop portions of the various embodiments generally are directed inward or rearward so as not to compromise the safety of any nearby riders. The lower drop portions may take a variety of forms including loops or curved or linear extensions projecting from the intermediate drop portions and may in some cases be removeably fitted to the handlebar system. Alternatively, the lower drop portion may be included in a closed loop which also includes the crosspiece and intermediate drop portions. The variety of lower gripping positions afforded by these designs allows the rider to obtain many of the advantages of forward projecting bars while remaining within the rules of the various sanctioning bodies.

Other embodiments of the invention include adapter kits for adding lower drop bar portions to already mounted conventional drop handlebars. The adapter kits include a variety of lower drop pieces which may be connected to the conventional drop portions or crosspiece of a conventional handlebar to allow the rider to grip the bar below the crosspiece and near the steering post. In some cases the adapter kit pieces may be added to the new handlebar designs already discussed to provide an even greater variety of lower drop gripping positions.

Another embodiment of the invention includes a pair of struts of solid or cable form which may be affixed between the drop portions of a handlebar and the front wheel fork for providing tension between the handlebar and the fork. These struts conserve rider effort and enhance rider performance by reducing unwanted upward handlebar flexing encountered under certain riding conditions.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view of a bicycle including one embodiment of the bicycle handlebar system;

FIG. 2 is a plan view of the handlebar shown in FIG. 1;

FIG. 3 is a front view of the handlebar shown in FIGS. 1 and 2;

FIG. 4 is a side view of the handlebar shown in FIGS. 1, 2, and 3;

FIG. 5 is a perspective view of the handlebar shown in FIGS. 1, 2, 3, and 4;

FIG. 6 is a fragmentary front view of a rider riding the bicycle shown in FIG. 1;

FIG. 7 is a fragmentary side view of a rider riding the bicycle shown in FIG. 1 including a phantom view illustrating the position of the rider's arms when gripping the crossbar;

FIG. 8 is a perspective view of another embodiment of the bicycle handlebar system;

FIG. 9 is an exploded perspective view of one embodiment of the adapter kit invention;

FIG. 10 is a perspective view showing the adapter of FIG. 9 attached to a conventional handlebar;

FIG. 11 is a fragmentary perspective view of a bicycle and handlebar system which includes a strut tensioning device;

FIG. 12 is an enlarged fragmentary perspective view illustrating the device of the strut to handlebar attachment shown in FIG. 11;

FIG. 13 is an enlarged fragmentary perspective view illustrating the fork to strut attachment of FIG. 11;

FIG. 14 is a perspective view of one embodiment of an adapter kit connected to a conventional drop handlebar;

FIG. 15 is a perspective view of a different adapter kit for use with the handlebar of FIG. 1;

FIG. 16 is a perspective view of another embodiment of the bicycle and handlebar system including a continuous loop feature; and FIG. 17 is a side view of the handlebar shown in FIG. 16.

DETAILED DESCRIPTION OF THE INVENTION

Bicycle handlebar systems which employ lower drop portions to provide comfortable, safe, low frontal area riding positions can take a variety of forms as illustrated by the following figures and accompanying discussion. Although the various embodiments of the invention appear different in physical structure, they generally share a common feature in that each embodiment allows a rider to assume an advantageous riding position by gripping a lower drop handlebar portion located near the steering post. Preferably, these positions allow the rider's hands to be placed in close proximity to one another to allow the rider to assume a narrow frontal profile. As will be discussed in detail in conjunction with FIGS. 6 and 7, handlebar portions located in this region afford many of the advantages of handlebars having forward projecting portions without compromising the safety of nearby riders.

Lower drop portion handlebars can be attached to otherwise conventional bicycles. For example, FIG. 1 illustrates an otherwise conventional bicycle which employs one embodiment of a lower drop style handlebar. Bicycle 20 includes a triangular-shaped frame 22 comprised of a top tube 24, a down tube 26 and a seat tube 28. Seat stays 30 and chain stays 32 join to rigidly secure a rear wheel 34 and its axle 36. Extending from seat tube 28 is a seat post 38. Mounted atop seat post 38 is a saddle 40. Seat post 38 may be raised or lowered into the seat tube to accommodate riders of differing heights. Top tube 24 and down tube 26 extend forwardly to a fork tube 42. Journaled within fork tube 42 is a stem 44 leading to front fork 46. Pedals 48 mounted to cranks 50 operate a drive sprocket 52 and a chain drive 54 in a known manner to propel the bicycle. One embodiment of a lower drop style handlebar system 56 is attached to stem 44 and allows the rider to comfortably maintain a low profile. Mounted to handlebar 56 are a pair of brake levers 58 protruding from a pair of brake hoods 60. A front wheel 62 having an axle 64 is secured within fork 46.

The detailed form of lower drop style bar 56 is illustrated in FIGS. 2, 3, 4, and 5, which are top, front, side and perspective views of handlebar 56 respectively. As shown best in FIG. 5, handlebar 56 has a pair of first bends 66 which turn forward from crosspiece 72, a pair of second bends 68 which turn first forwardly and downwardly and then downwardly and rearwardly to almost complete a semicircular arc, and a pair of third bends 70 which turn inwardly in a direction generally toward handlebar stem 44. The first bends are best shown from above the bar, see FIG. 2, where a crosspiece 72 has a central portion 74 which extends into a pair of sideways projecting portions 76. Central portion 74 is secured to stem 44 in a conventional manner. Sideways portions 76 extend sideways from stem 44 and further extend into intermediate drop portions 78 which include second bends 68, which can best be seen in the side view of FIG. 4. The perspective view of FIG. 5 best illustrates how intermediate drop portions 78 next extend into lower drop portions 80 at third bends 70.

In one preferred embodiment and as shown in the drawings generally, first bends 66 turn forwardly approximately 90 degrees from crosspiece 72, second bends 68 turn forwardly, downwardly, and rearwardly to define an arc of approximately 160 degrees, and third bends 70 turn inward approximately 90 degrees. The ends of lower drop bars 80 are converging toward the center and are generally coaxial with each other. An additional side gripping position which is comfortable for the rider is included in the preferred embodiment as four-centimeter-long straight portions 82, which are located immediately after first bend 66 and before second bend 68.

In the illustrated embodiment, lower drop portions 80 are located approximately two centimeters forward of crosspiece 72. In other embodiments, drop portion 80 may be either ahead or behind of crosspiece 72 depending on stem length and crossbar rotation. Lower drop portions 80 also define a lower drop portion gap G, of approximately twelve centimeters. The gap G allows side pull brake calipers to operate without interference. Additionally, in one version, there is a fourteen centimeter vertical distance between crosspiece 72 and lower drop portions 80 which is a shallow drop. In another version, there is a sixteen centimeter vertical distance between crosspiece 72 and drop portions 80 which is a deep drop. The horizontal distance between intermediate drop portions 78 is typically 40 to 44 centimeters. It should be understood that these dimensions are for an adult rider, and that several ranges of dimensions are commonly provided for riders of different sizes. Additionally, wider bar configurations would be desirable if wider bars were allowed under the rules of certain sanctioning bodies.

The handlebars of FIGS. 1-5 can be constructed by bending type 7075 aluminum tubing having a 24 millimeter outer diameter and a 1.4-1.5 millimeter wall thickness. Preferably, the tubing is bent into curved regions as shown. Curved bends are preferred because handlebars constructed with angular bends exhibit a higher degree of unwanted handlebar flex. While the handlebars of FIGS. 1-5 are shown as being taped, the bar is typically sold to the rider as an untaped bar. This allows the rider to add handlebar tape to suit his personal preference.

A lower drop style handlebar system such as that described in conjunction with FIGS. 1-5 improves both the aerodynamic position and stamina of the rider when compared to the conventional style drop handlebars used in road racing. FIGS. 6 and 7 illustrate one advantageous riding position that may be assumed by a rider employing the present lower drop style handlebars. FIG. 6 shows a rider R gripping handlebar 56 at its innermost lower drop positions 90. When gripping the bar in this manner, rider R has assumed a comfortable position having a minimal frontal area. In this gripping position, the rider's arm forms an obtuse angle A as seen in FIG. 7. If rider R was instead to grip handlebar 56 on its crosspiece 72, as would occur using conventional handlebars, rider R would be forced to bend his arms at an uncomfortable acute angle B shown on FIG. 7 if he desired to maintain a low position. Alternatively, if rider R assumed a comfortable, more extended arm position, rider R would become more upright and exhibit an undesirable greater frontal area.

A rider R using conventional handlebars might also attempt to maintain a low, comfortable position by gripping the conventional handlebar in approximately the same regions as provided by intermediate drop portions 78 of handlebar 56. While the resultant rider position might be low and comfortable, the aerodynamic properties of the position would be less desirable because the wider spread of the rider's arms would increase drag. As illustrated in FIGS. 6 and 7, these conflicting is are resolved by adding lower drop portions such as portion 80, which allow the rider R to maintain a low and narrow position while at the same time extending his arms in comfortable, obtuse angle. The benefits obtained from this design approach those obtained by forwardly projecting bars while at the same time minimizing any perceived safety hazard associated with forwardly projecting bars.

Another embodiment providing multiple lower drop positions is shown in FIG. 8, in which a handlebar 92 includes a crosspiece 94 and a pair of intermediate outer drop portions 96 following first bend 98. A pair of inner, lower drop portions 100 extend first forwardly and downwardly and then downwardly and rearwardly from crosspiece 94 at a position on crosspiece 94 between intermediate outer drop portions 96. Inner, lower drop portions 100 provide a comfortable, minimal frontal cross-section position for a rider similar to that shown in FIGS. 6 and 7, but allow the rider's hands to be turned generally perpendicular to crosspiece 94 when gripping handlebar 92 on inner, lower drop portions 100.

Handlebar 92 also provides an additional advantage to the rider not found on handlebar 56 of FIG. 1. As can be appreciated from viewing FIG. 8, the rider may grip lower drop portions 100 at a variety of gripping positions along portions 100. This enables the rider to choose the relative vertical position of his hands which he finds most comfortable.

In addition to the handlebar systems already discussed, other embodiments of the invention may be provided as adapter kits for conventional handlebar systems. Adapter kits provide a potentially inexpensive means for providing many of the advantages of a lower drop style bar to a pre-existing handlebar system. One embodiment of an adapter kit is shown in FIG. 9. A conventional drop handlebar 102 includes a crosspiece 104 attached to stem 44. Crosspiece 104 extends into a pair of conventional intermediate outer drop portions 96 at first bends 98. Crosspiece 104 includes a pair of apertures 106 through which a pair of threaded inner drop loop securing means 108 may be inserted to secure an inner, lower drop loop 110. Lower drop loop 110 includes a pair of intermediate drop loop portions 112 which curve first forwardly and downwardly from crosspiece 104 and then downwardly and rearwardly to a loop lower drop portion 114 which joins intermediate portions 112. Lower drop loop 110 provides inner, lower gripping positions in which the rider's hands can be oriented either perpendicularly to or parallel to crosspiece 104, thereby incorporating most of the advantages of the bars shown in FIGS. 6 and 8. In addition, the continuous connection between the pair of lower drop bars provided by the bight of the loop 110 strengthens the entire assembly to resist bending forces which otherwise might distort or loosen the add-on bars. The inner lower drop loop configuration of FIG. 9 may be provided as an integral part of a handlebar system as shown in FIG. 10.

While rider stamina can be increased by providing comfortable, low frontal area riding positions, rider performance can be increased by removing unwanted flex from bicycle components. This principal is illustrated in another embodiment of the invention which provides struts for tensioning the handlebar system under certain riding conditions. The struts provide a downward tensioning force on the handlebar system to prevent upward handlebar flex under certain riding conditions, such as when the rider is accelerating, but still allow the handlebar to flex in the downward direction to retain the shock absorbing benefits of downward handlebar flex. One strut embodiment is shown in FIGS. 11–13, in which a handlebar 116 is substantially similar to handlebar 56 of FIG. 1 but includes apertures 118, see FIG. 12, located in lower drop portions 117 for attaching a pair of struts 120 between drop portions 117 and fork 46. Struts 120 are attached to fork 46 using a pair of strut clamping means 122, see FIG. 13. The use of struts 120 to reduce upward flex in handlebar 116 permits a more efficient transmission of power to the bicycle. This, in turn, can enable the rider to accelerate more quickly than would be possible if rider power was wasted as a result of upward handlebar flex. Struts 120 can provide a similar beneficial effect when attached to potentially flexible portions of other handlebar systems, although their use with a lower drop style bar allows the strut ends to be placed at a more in-board position which may offer safety advantages in a mass start event.

FIG. 12 shows in detail how strut 120 is threaded through lower drop portion 117. Strut 120 passes through apertures 118 and has an upper strut end 124 having at least one dimension larger than aperture 118. This strut 120 to pull against handlebar 116 when handlebar 116 is flexed upwardly. As shown, apertures 118 may be recessed to prevent upper strut end 124 from protruding beyond the generally cylindrical surface of lower drop portion 117. FIG. 13 shows strut clamping means 122 in detail. Clamping means 122 includes a fork clamp 126 which is attached to fork 46 (not shown, see FIG. 11) by tightening a fork clamp screw 128. A strut clamp 130 includes a pair of strut clamping members 132 which are attached to fork clamp 126 using screw 134 and bolt 136. Strut 120 is placed between serrated inner surfaces 138 of clamping members 132 and secured by tightening bolt 136. Strut 120 is shown as a flexible cable, but may also be a solid material of small enough cross-sectional dimension to permit the strut to flex when the handlebar is flexed downward It is important that the solid strut be capable of flexing, because if it does not flex, the downward handlebar flex which normally absorbs shocks caused by road surface imperfections will be lost. Struts 120 may be secured by any conventional means well known in the art for connecting cable wire to a metal member or for connecting a solid spoke to a metal member.

An embodiment of a lower drop bar adapter kit is shown in FIG. 14 which can be easily added to a conventional drop handlebar. In this embodiment, a conventional handlebar 140 is fitted with a pair of add-on lower drop bars 142. Drop bars 142 are generally linear and coaxially directed toward one another from the drop positions of conventional handlebar 140. As shown, bars 142 each include an aperture for fitting over conventional handlebar ends 144. Bars 142 may be attached to ends 144 by any of several methods well known in the art. For example, outer ends of bars 142 mounted as shown may include clamping means which can be secured to conventional handlebar ends 144 by tightening a nut and bolt. Alternatively, the add-on lower drop bars may include an expansion plug (not shown) for fitting within the open end of conventional handlebar ends 144. Such a plug would employ an initially non-expanded plug means directed forwardly from the outer ends of bars 142. The plug means could be inserted into the open ends 144 and then be expanded to secure bars 142.

A lower drop bar adapter piece may also be fitted to a lower drop style bar to provide additional gripping positions or to add rigidity to the lower drop portions. FIG. 15 illustrates such an embodiment of the invention. In this embodiment, handlebars 56 are fitted with a lower drop adapter tube 146 such that a continuous lower drop region 148 is formed below crosspiece 72. Lower drop adapter tube 146 can be secured to handlebars 56 by any of several means well known in the art. Besides providing a continuum of lower drop positions, adapter tube 146 can reduce flex in handlebar 56 which may compromise the transfer of rider power to the bicycle under certain pedaling conditions as discussed in conjunction with FIG. 11. Flexing can also be reduced, and additional riding positions provided, by attaching a pair of adapter bars (not shown) which extend forwardly, upwardly and rearwardly from lower drop portions 80 to crosspiece 72. These adapters may be positioned at any convenient axial location along lower drop portions 80 and crosspiece 72, thereby reducing flex in the lower drop portions and adding additional lower drop gripping positions.

A final embodiment of a lower drop style bar having a curved lower drop means is illustrated in FIGS. 16 and 17. A handlebar 150 forms a continuous loop offering a variety of rider grip positions in lower drop region 151. Each side of handlebar 150 includes a forward turning first bend 152, a forward, downward and rearward turning second bend 154, and a first rearward and inward then inward, forward and upwardly turning bend 156. Bends 156 join at a generally U-shaped fourth bend 158 which is generally forward and upwardly extending with the open portion of the U opening rearward towards the rider. Fourth bend 158 may be positioned within the generally C-shaped profile defined by second bend 154 as shown by the side view of handlebar 150 in FIG. 17. As shown, fourth bend 158 projects forwardly and upwardly to provide some of the advantages of forward projecting handlebars. Additionally, fourth bend 158 may be removed, leaving handlebar 150 with two unconnected upward, inward, and forwardly projecting lower drop extensions 160. Finally, an adapter kit (not shown) for a conventional drop-style handlebar can be provided which adds third and fourth bends 156 and 158 to adapt the conventional bar to the closed loop configuration of FIGS. 16 and 17.

Thus, the handlebar systems and adapter kits of FIGS. 1-17 provide handlebar systems which allow a rider to comfortably maintain a minimal frontal area without compromising the safety of nearby riders. These advantages are attained primarily by adding lower drop handlebar portions in a region below the cross bar. While certain embodiments of the invention have been discussed, it is intended to cover all embodiments, combinations and modifications as defined by the appended claims.

I claim:

1. A bicycle comprising a frame, a rear wheel journaled to the frame, a steering post journaled to the frame, a front fork attached to the steering post, a front wheel journaled to the fork, a saddle affixed to the frame at a predetermined position above the frame, and a handlebar connected to the steering post, said handlebar including a crosspiece having a central region connectable with the steering post and having sideways portions extending sideways therefrom, a pair of intermediate drop portions each having a first generally forwardly and downwardly extending portion extending from said crosspiece and extending therefrom a second downwardly and rearwardly extending portion, and at least one lower drop portion extending from the intermediate drop portions or the sideways portions and extending on opposite sides of the steering post and generally beneath the steering post to define a pair of hand gripping positions located generally beneath the steering post to allow the rider to assume a narrow frontal profile.

2. The bicycle of claim 1 wherein each of said sideways portions extends into said forwardly and downwardly extending intermediate portions at a first bend, each of said intermediate portions includes a second bend, and each of said downwardly and rearwardly extending intermediate portions extends into the lower drop portion at a third bend, said lower drop portion comprising a pair of portions converging inwardly from said third bends.

3. The bicycle of claim 2 wherein said handlebar lower drop portions are substantially parallel to said crosspiece.

4. The bicycle of claim 3 wherein said handlebar first bends turn forwardly approximately 90 degrees, said second bends turn forwardly, downwardly and rearwardly approximately 160 degrees, and said third bends turn inwardly approximately 90 degrees.

5. An adapter kit for an original bicycle handlebar having a crosspiece with a central portion connectable to a steering post located forwardly of a bicycle seat and a pair of original drop portions extending forwardly and downwardly from ends of the crosspiece, comprising:
at least one lower drop portion for providing a plurality of hand gripping positions beneath said handlebar crosspiece; and
attaching means for attaching said lower drop portion to the original handlebar with an orientation forward of said steering post and generally beneath said crosspiece to define hand gripping positions located inside of the original drop portions and generally beneath the steering post to allow the rider to assume a narrow frontal profile.

6. The adapter kit of claim 5 having a pair of add-on lower drop bars for attaching to the original handlebar to add a pair of inwardly converging lower drop portions to the handlebar which terminate in ends having a gap therebetween.

7. The adapter kit of claim 5 wherein said pair of add-on bars are generally straight and directed generally toward one another by the attaching means.

8. The adapter kit of claim 7 wherein said add-on bars are coaxially directed toward one another, are substantially parallel to said crosspiece, and are below said crosspiece when attached to the original handlebar by the attaching means.

9. The adapter kit of claim 8 wherein each said add-on bar has an aperture for receiving an end of the original handlebar and the attaching means includes a clamping means for securing the original handlebar end within said aperture.

10. The adapter kit of claim 6 wherein each said pair of add-on lower drop bars attaches between the crosspiece of the original handlebar and an original handlebar portion below said crosspiece.

11. The adapter kit of claim 5 wherein a single lower drop portion attaches to the original handlebar at two points no higher than the crosspiece for providing a continuum of lower drop hand gripping positions.

12. The adapter kit of claim 11 wherein said lower drop portion comprises a straight tube for connecting two coaxially oriented ends of the original drop portions.

13. A bicycle handlebar connectable to a steering post located forwardly of a bicycle seat, comprising:
a crosspiece having a central section connectable with the steering post and a pair of sideways portions extending sideways therefrom;
a pair of intermediate drop portions extending forwardly and downwardly from the pair of sideways portions to a region generally beneath the crosspiece; and
a pair of lower drop sections extending from one of the pair of portions to opposite sides of the steering post and generally beneath the steering post for defining a pair of hand gripping positions located generally beneath the steering post to allow the rider to assume a narrow frontal profile.

14. The handlebar of claim 13 wherein the pair of lower drop sections terminate at ends having a gap therebetween with the gap being located beneath the steering post.

15. The handlebar of claim 14 wherein the gap between said lower drop sections is between 6 and 18 centimeters.

16. The handlebar of claim 13 wherein the pair of lower drop sections are between ten and twenty centimeters below the crosspiece.

17. The handlebar of claim 13 wherein the pair of lower drop sections extend from the pair of intermediate drop portions and are formed by bends in tubing whereby the handlebar is formed of an integral piece of tubing.

18. The handlebar of claim 13 wherein the pair of intermediate drop portions extend forwardly approximately 90 degrees and then extend forwardly, rearwardly and downwardly approximately 160 degrees, and the pair of lower drop sections extend from the intermediate drop portions inwardly approximately 90 degrees to converge coaxially toward each other.

19. The handlebar of claim 13 wherein the pair of lower drop sections have a connection portion which connects together the lower drop sections.

20. The handlebar of claim 19 wherein at least the connecting portion is a part of an adapter piece which is removably added to the handlebars and which reduces flex in the handlebars when attached.

21. The handlebar of claim 13 further comprising a pair of flexible struts connectable between the pair of lower drop sections and a front wheel fork for reducing upward handlebar flex while permitting downward handlebar flex.

22. The handlebar of claim 21 wherein each of said flexible struts comprise a flexible cable connectable in tension with the front wheel fork and the lower drop sections.

23. The handlebar of claim 13 wherein at least one handbrake is mounted to the intermediate drop portions.

24. The handlebar of claim 13 wherein the pair of lower drop sections are inside of the pair of intermediate drop portions and extend forwardly and downwardly from the pair of sideways portions to thereby define multiple lower drop hand gripping positions for the rider.

25. A bicycle handlebar connectable to a steering post located forwardly of a bicycle seat, comprising:
a crosspiece tube having a central portion connectable with the steering post and a pair of sideways portions extending sideways therefrom;
a pair of integral intermediate drop portions formed by bends extending forwardly and downwardly from the pair of sideways portions to a region generally beneath the crosspiece; and
a pair of integral lower drop portions formed by bends extending inwardly from the pair of intermediate drop portions to define hand gripping positions in which the lower drop portions are generally parallel to the crosspiece tube and terminate with a pair of ends having a gap therebetween with the gap being generally beneath the steering post.

26. The handlebar of claim 25 wherein the pair of lower drop portions converge towards the center and are generally coaxial with each other.

27. The handlebar of claim 26 wherein the gap is between 6 and 18 centimeters in length.

28. The handlebar of claim 25 further comprising a connecting piece adaptable to connect to the pair of ends in order to bridge the gap and connect together the pair of lower drop portions.

29. A bicycle handlebar connectable to a steering post located forwardly of a bicycle seat, comprising:
a crosspiece having a central portion connectable with the steering post and a pair of sideways portions extending sideways therefrom;
a pair of outer drop portions extending forwardly and downwardly from end regions of the pair of sideways portions to a region generally beneath the crosspiece to define hand gripping positions beneath the crosspiece; and
at least one inner drop portion extending forwardly and downwardly from a region of the crosspiece located inside of the end regions to a region generally beneath the crosspiece to define a hand gripping position located generally beneath the steering post to allow the rider to assume a narrow frontal profile.

30. The handlebar of claim 29 wherein said at least one inner drop portion comprises a pair of inner drop portions, one located on each side of the crosspiece central portion whereby at least four drop portions extend forwardly and downwardly from the crosspiece.

31. The handlebar of claim 29 further comprising securing means which include a threaded connector for attaching the inner drop portion to the inside region of the crosspiece.

32. The handlebar of claim 29 wherein the at least one inner drop portion comprises a continuous drop loop which provides inner lower hand gripping positions in which the rider's hands can be oriented either perpendicularly to or parallel to the crosspiece.

* * * * *